United States Patent Office.

CHARLES E. BLAKE, OF SAN FRANCISCO, CALIFORNIA.

Letters Patent No. 69,393, dated October 1, 1867.

---

IMPROVED TOOTH-POWDER LOZENGES.

---

The Schedule referred to in these Letters Patent and making part of the same.

---

KNOW ALL MEN BY THESE PRESENTS:

That I, Dr. CHARLES E. BLAKE, of the city and county of San Francisco, State of California, have made and invented a new and original design in the preparation and mode of applying materials for the cleansing of the teeth, which I form into a Tooth-Powder Lozenge, and for which I wish to procure Letters Patent. The following is a description of the materials used and the mode of preparing and using the same.

I propose to manufacture a preparation for the purifying and cleansing of the teeth in the form of a lozenge that shall contain all the necessary ingredients of the desired quantity to be used at one time, that may be put in the mouth without waste, or discoloring the lips, except what may occur in using the brush. I also propose making an article that will not be affected by dampness or age, retaining its flavor longer by being in this form.

The lozenge can be made in any shape and packed in any kind of box, it not being liable to waste in case of accident to the package in which it is put up. It is in this form particularly adapted to be used by roommates, as it, like any other lozenge, only affects the one using.

I propose to form this tooth-powder lozenge by mixing or combining with chalk or charcoal as a base ratanhy bark, soap, sugar, licorice, finely-powdered bone of the cuttle-fish, with gum arabic, or their equivalents, in proper proportions, flavored with rose, bergamot, winter-green, or any other desired ingredient or flavor.

My object is not so much in the materials used as in the combining, and particularly in forming a lozenge for the purposes specified, and to accomplish the objects in this form of application. The forming of toothpowder into the shape or configuration of a lozenge is deemed new, and it is for this that I desire to secure the rights and privileges to manufacture under Letters Patent, in such cases made and provided. I propose to have it known and marked Dr. Charles E. Blake's Tooth-Powder Lozenge.

The foregoing is a full, clear, and exact description, reference being had to the accompanying specimens or sample, making part of this specification.

*Claim.*

I claim the making of tooth-powder in the form of lozenges.

San Francisco, July 18, 1867.

CHAS. E. BLAKE.

Witnesses:
  HENRY HAIGHT,
  JOSEPH A. ATKINSON.